United States Patent
Birchak et al.

(10) Patent No.: US 6,594,199 B2
(45) Date of Patent: Jul. 15, 2003

(54) HYDROPHONE FOR USE IN A DOWNHOLE TOOL

(75) Inventors: James R. Birchak, Spring, TX (US);
Alvin B. Miller, Alvarado, TX (US);
John W. Harrell, Waxahachie, TX (US)

(73) Assignee: Halliburton Energy Services, Inc., Dallas, TX (US)

( * ) Notice: Subject to any disclaimer, the term of this patent is extended or adjusted under 35 U.S.C. 154(b) by 0 days.

(21) Appl. No.: 10/154,121

(22) Filed: May 23, 2002

(65) Prior Publication Data

US 2002/0136090 A1 Sep. 26, 2002

Related U.S. Application Data

(63) Continuation of application No. 09/411,078, filed on Oct. 4, 1999, now Pat. No. 6,438,070.

(51) Int. Cl.[7] .................................................. G01V 1/40
(52) U.S. Cl. ...................................... 367/83; 340/854.3
(58) Field of Search .......................... 367/83, 155, 157, 367/162, 167; 181/102, 104; 340/854.3

(56) References Cited

U.S. PATENT DOCUMENTS

| | | |
|---|---|---|
| 3,713,086 A | 1/1973 | Trott |
| 3,748,502 A | 7/1973 | Bernstein |
| 3,802,252 A | 4/1974 | Hayward et al. |
| 3,832,762 A | 9/1974 | Johnston et al. |
| 3,929,019 A | 12/1975 | Younkin |
| 3,970,878 A | 7/1976 | Berglund |
| 3,988,620 A | 10/1976 | McDavid |
| 4,011,474 A * | 3/1977 | O'Neill ........................ 310/328 |
| 4,031,544 A | 6/1977 | Lapetina |
| 4,117,718 A | 10/1978 | Hayward |
| 4,302,826 A * | 11/1981 | Kent et al. ...................... 367/82 |
| 4,344,010 A | 8/1982 | Vig et al. |
| 4,364,117 A | 12/1982 | Snow |
| 4,477,783 A * | 10/1984 | Glenn ........................ 367/155 |
| 4,499,566 A * | 2/1985 | Abbott ........................ 367/165 |
| 4,677,336 A | 6/1987 | Kushida et al. |
| 4,694,440 A | 9/1987 | Ogura et al. |
| 4,695,988 A | 9/1987 | Banno |
| 4,803,392 A | 2/1989 | Kushida et al. |
| 4,841,494 A | 6/1989 | Banno |
| 4,864,179 A | 9/1989 | Lapetina et al. |
| 4,906,917 A * | 3/1990 | Olness et al. ................ 310/327 |

(List continued on next page.)

OTHER PUBLICATIONS

Benthos AQ–2, AQ–3 & AQ–4 Hydrophone Cartridges data Sheet, dated 1999.

*Primary Examiner*—Ian J. Lobo
(74) *Attorney, Agent, or Firm*—Marlin R. Smith

(57) ABSTRACT

A pressure pulse sensor and associated methods provide enhanced functionality and convenience in detecting pressure pulses. In a described embodiment, a hydrophone includes a stack of disc-shaped lead titanate piezoelectric crystals enclosed within an epoxy membrane and a mounting portion which is aligned with a center of mass of the crystal stack.

25 Claims, 5 Drawing Sheets

U.S. PATENT DOCUMENTS

| | | |
|---|---|---|
| 4,949,316 A | 8/1990 | Katahara |
| 4,999,819 A | 3/1991 | Newnham et al. |
| 5,030,873 A * | 7/1991 | Owen .......................... 367/162 |
| 5,065,068 A | 11/1991 | Oakley |
| 5,142,914 A | 9/1992 | Kusakabe |
| 5,144,597 A | 9/1992 | Lagier et al. |
| 5,155,708 A | 10/1992 | Bedi et al. |
| 5,155,709 A * | 10/1992 | Flanagan et al. ........... 367/174 |
| 5,196,756 A | 3/1993 | Kohno et al. |
| 5,233,260 A * | 8/1993 | Harada et al. .............. 310/328 |
| 5,343,759 A | 9/1994 | Hesthamar et al. |
| 5,367,500 A * | 11/1994 | Ng ............................. 367/157 |
| 5,465,626 A | 11/1995 | Brown et al. |
| 5,517,073 A | 5/1996 | Ohkuma |
| 5,527,480 A | 6/1996 | Bailey et al. |
| 5,572,487 A | 11/1996 | Tims |
| 5,578,759 A * | 11/1996 | Clayton ...................... 310/338 |
| 5,578,888 A * | 11/1996 | Safabakhsh ................. 310/328 |
| 5,646,470 A | 7/1997 | de Groot |
| 5,701,277 A * | 12/1997 | Ring et al. .................. 367/163 |
| 5,789,844 A | 8/1998 | de Groot |
| 5,852,245 A | 12/1998 | Wesling et al. |
| 5,852,587 A * | 12/1998 | Kostek et al. ................ 367/82 |
| 5,936,913 A * | 8/1999 | Gill et al. ................... 181/102 |

\* cited by examiner

HYDROPHONE FOR USE IN A DOWNHOLE TOOL

This is a continuation of patent Ser. No. 09/411,078 U.S. Pat. No. 6,438,070, filed Oct. 4, 1999, such prior patent being incorporated by reference herein in its entirety.

BACKGROUND OF THE INVENTION

The present invention relates generally to sensor construction and use in communication systems and, in an embodiment described herein, more particularly provides a hydrophone for use in a downhole tool.

Many applications exist for hydrophones and other pressure pulse sensors. For example, in the downhole environment, a hydrophone may be used in a tool to receive signals transmitted as pressure pulses from the surface, a sensor may monitor seismic signals that create pressure waves in a wellbore, a drill string may include a sensor to monitor hydrostatic pressure waves during drilling, etc. Of course, applications exist in other environments as well.

Unfortunately, conventional hydrophones and other pressure sensors are typically somewhat fragile, do not respond well to low frequency pressure waves and are sensitive to movement of the tools carrying the sensors. The fragility and tool movement sensitivity problems are undesirable in any environment, but are particularly detrimental in the downhole environment where tool movement, shock and vibration, temperature extremes, etc. are common. Additionally, where a pressure sensor is used in a downhole signal transmission system, the lack of low frequency response is very undesirable since it is known that pressure pulses are attenuated far less at low frequencies and, therefore, low frequency signals may be transmitted greater distances. Thus, it would be a significant improvement in the art to provide a pressure sensor that is robust, is insensitive to movement of the tool carrying the sensor, and which has enhanced low frequency response.

Hydrophones used in downhole tools are usually each contained in a fluid-filled chamber, which is isolated from well fluids by a floating piston. Well fluids are typically conductive and sometimes corrosive, acidic, or otherwise harmful to sensors, and so the floating piston is used to separate the well fluids from the hydrophone sensor. The fluid contained in the chamber about the sensor is typically an inert oil, such as silicone oil.

This configuration, wherein a floating piston separates well fluids from oil in the sensor chamber, has several drawbacks. Maintenance of the sensor is inconvenient, since the chamber must be filled with the oil and evacuated of air each time the sensor is disturbed. There is a requirement that the special oil be available each time the sensor is serviced. Additionally, the floating piston must displace to transmit a pressure pulse thereacross and may hinder the detection of low frequency pressure pulses by the sensor, due to the mass of the piston and the friction between its seals and the bore in which it reciprocates.

Therefore, it may be seen that it would be very desirable to provide an improved and more convenient method of isolating a sensor from well fluids. Furthermore, it would be very desirable to enhance the low frequency response of a pressure sensor while obtaining the improved isolation from well fluids.

SUMMARY OF THE INVENTION

In carrying out the principles of the present invention, in accordance with an embodiment thereof, a hydrophone is provided which includes multiple piezoelectric crystals arranged in a stack. Methods associated with improved pressure sensors are also provided.

In one aspect of the present invention, a pressure pulse sensor is provided which includes at least one lead titanate piezoelectric crystal. The crystal is sensitive to axial forces applied thereto, but is relatively insensitive to lateral forces. The crystal is, therefore, insensitive to lateral accelerations of the fixture or tool holding the sensor. Preferably, the crystal is generally disc-shaped.

In another aspect of the present invention, a stack of piezoelectric crystals are used in a pressure pulse sensor. The crystals may be axially aligned and may be adhered to each other to thereby permit transmission of tensile forces therebetween. Acceleration of a tool in which the sensor is carried will preferably create tension in one portion of the crystal stack and compression in another portion of the stack, when the acceleration is along the axis of the stack. In this manner, the output of the crystals in tension due to the acceleration will cancel the output of the crystals in compression due to the acceleration, thereby eliminating any contribution of the tool movement to the sensor output.

In a further aspect of the present invention, the stack of piezoelectric crystals are mounted to a tool so that acceleration of the tool along an axis of the stack produces compressive forces in one portion of the stack and tensile forces in another portion of the stack. In several described embodiments, a mounting portion of the sensor is aligned with a center of mass of the crystal stack. When the center of mass of the crystal stack is accelerated along the stack axis by the mounting portion, one portion of the stack is in compression and another portion of the stack is in tension.

In yet another aspect of the present invention, a membrane may be used to isolate one or more piezoelectric crystals of a sensor from fluid surrounding the sensor. Preferably, the crystals are in direct contact with the membrane and the membrane completely encloses the crystals. The membrane does, however, permit transmission of fluid pressure pulses from the fluid to the crystals.

In still another aspect of the present invention, a membrane enclosing one or more piezoelectric crystals of a sensor is sealed to a bulkhead. At least one conductor extends outwardly from the crystals, through the membrane and into the bulkhead. The membrane may apply a compressive force to the bulkhead at a circuitous path formed on the bulkhead. Additionally, the membrane may extend into a passage formed in the bulkhead through which the conductor extends, and the membrane may be mixed with an insulating substance in the passage.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
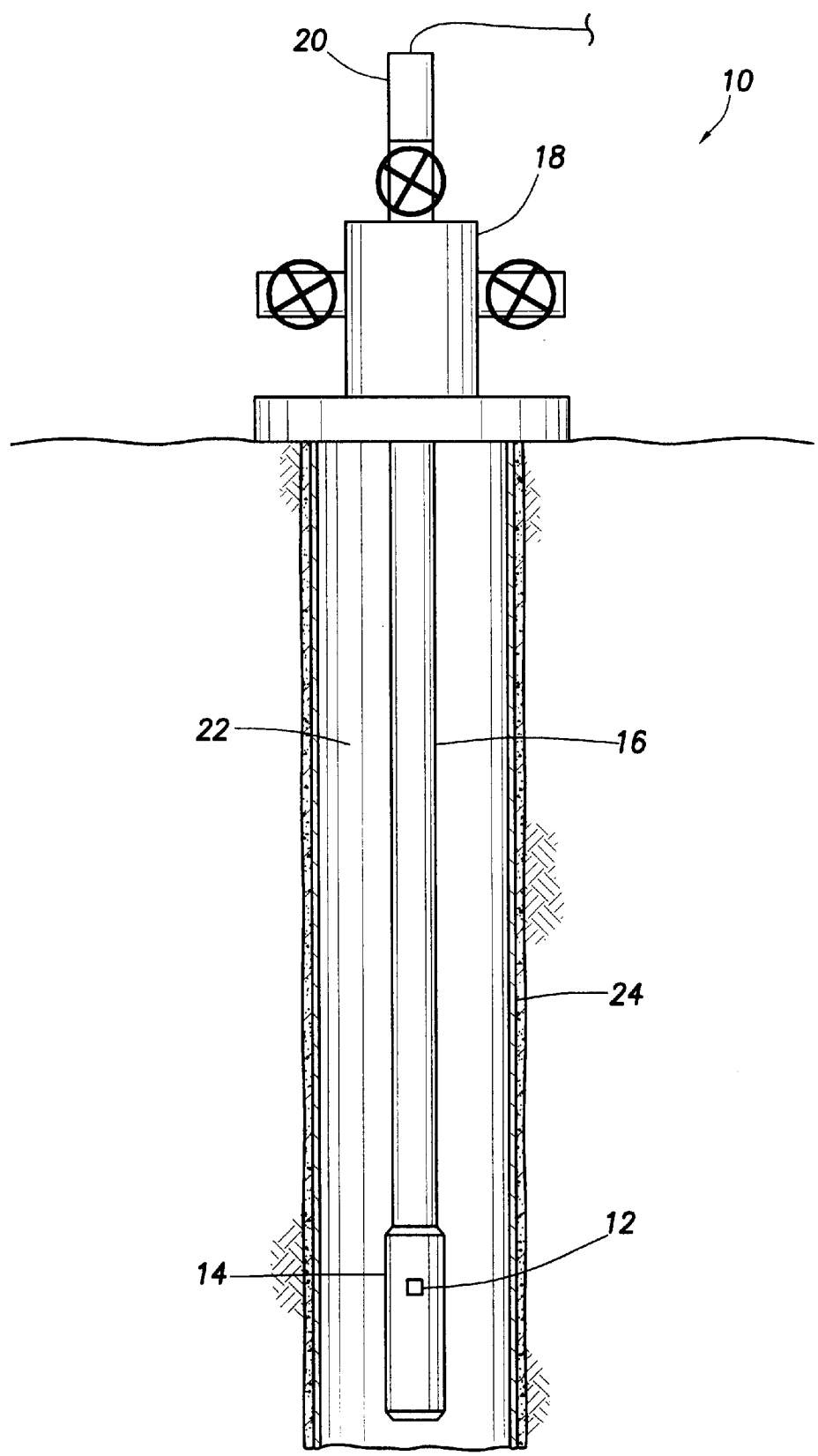
FIG. 1 is a schematic partially cross-sectional view of a method embodying principles of the present invention.

Representatively illustrated in FIG. 1 is a method 10 which embodies principles of the present invention. In the following description of the method 10 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., without departing from the principles of the present invention.

In the method 10, a pressure pulse sensor 12 is installed in a downhole tool 14, which is positioned in a well suspended by a tubing string 16. Attached to a wellhead 18 at the earth's surface is an acoustic impulse gun or air gun 20, or another type of pressure pulse transmitter. The gun 20 is used to apply a series of pressure pulses to fluid 22 in the well, to thereby transmit a signal to the remotely located sensor 12. A suitable gun for use in the method 10 is described in copending application Ser. No. 09/184,794, the disclosure of which is incorporated herein by this reference. Note that the fluid 22 may be liquid, gas, or a combination of liquid and gas, and the signal may be transmitted through the fluid outside of the tubing string 16, inside the tubing string, or a combination of inside and outside the tubing string.

It is to be clearly understood that the principles of the present invention are not limited to applications in which a pressure pulse sensor is installed in a tool attached to a tubing string positioned in a well and a pressure pulse transmitter is positioned at the earth's surface to transmit a signal through fluid in the well as described above for the method 10. Instead, principles of the present invention may be incorporated in many other applications. For example, the tool 14 could be conveyed on wireline or slickline, the sensor 12 could be installed in casing 24 lining the well, the pressure pulse transmitter 20 could be in the well, the sensor could be installed in an environment other than a well, etc.

Due to the advances in the art provided by the present invention, which are described in detail below, the applicants are now able to communicate signals via pressure pulses between the gun 20 and the sensor 12 at frequencies less than 20 Hz. Preferably, signals are transmitted at frequencies between 1 and 20 Hz in the method 10. Such low frequency pressure pulse signals are received at far greater depths than before possible with conventional pressure pulse sensors.

Figure 2A:
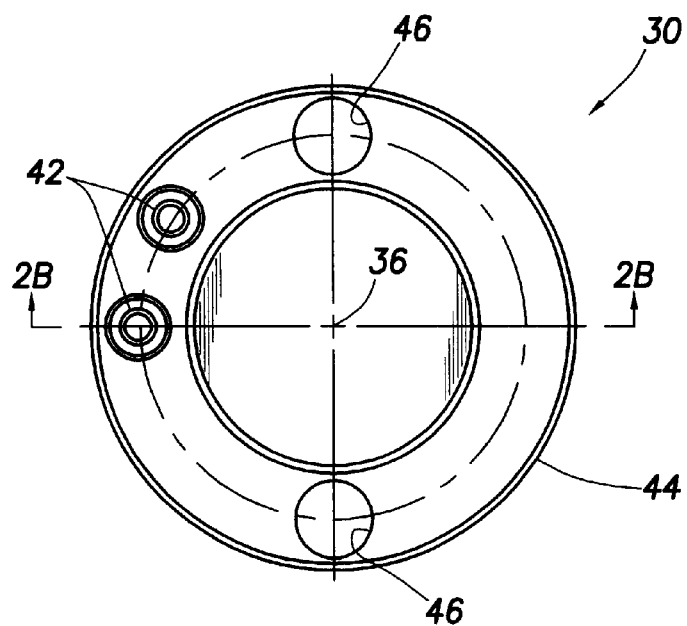
FIGS. 2A&B are top plan and cross-sectional views, respectively, of a first hydrophone embodying principles of the present invention.

Referring additionally now to FIGS. 2A&B, a hydrophone 30 embodying principles of the present invention is representatively illustrated. The hydrophone 30 may be used for the sensor 12 in the method 10, or in other methods. The hydrophone 30 has capabilities which enable the low frequency communication desirable for the method 10. Additionally, the hydrophone 30 is convenient to manufacture and maintain, is robust, is highly sensitive to pressure pulses applied thereto, and is insensitive to movements of the tool in which it is installed.

The hydrophone 30 includes multiple generally disc-shaped piezoelectric crystals 32, which are arranged so that they are axially aligned in a stack 34. Thus, the stack axis 36 corresponds to the axis of each of the individual crystals 32. For purposes that are described more fully below, the crystals 32 are adhered to each other, for example, using an adhesive, so that tensile force may be transmitted from each crystal to adjacent crystals.

The stack 34 is enclosed by a relatively thin membrane 38. The membrane 38 isolates the crystals 32 from contact with fluid surrounding the hydrophone 30, but permits pressure pulses to be transmitted from the fluid to the crystals. For example, in the method 10, the hydrophone 30 could be directly exposed to the well fluid 22, without risk of damage to the crystals 32. Note that the membrane 38 eliminates the need for an oil-filled chamber surrounding the hydrophone 30 and enhances the sensitivity of the hydrophone to pressure pulses applied thereto.

Preferably, the membrane 38 is made of an epoxy material and is in direct contact with the crystals 32 for maximum transmission of pressure pulses. However, it is to be clearly understood that other materials may be used for the membrane 38, and that it is not necessary for the membrane to be in direct contact with the crystals 32, in keeping with the principles of the present invention.

The crystals 32 are wired in parallel using conductors 40. The conductors 40 are attached to connectors 42 for interconnection of the hydrophone 30 to a tool's communication system.

Note that the crystal stack 34, the conductors 40 and the connectors 42 are all contained by the material, such as epoxy, of which the membrane 38 is also formed. This configuration makes for a very robust sensor which is also very convenient to install and maintain in a tool. The disc-shaped construction of the crystals 32, and their combination into the stack 34, also contributes substantially to the robustness of the hydrophone 30.

The connectors 42 are positioned in a mounting portion 44 of the hydrophone 30. The mounting portion 44 is generally annular-shaped and extends radially outward from the membrane 38. The mounting portion 44 is substantially thicker laterally and axially than the membrane 38 and is capable of serving as a facility for mounting the hydrophone 30 to a tool. Holes 46 are provided through the mounting portion 44 for fasteners (not shown) to attach the hydrophone 30 to a tool. Of course, other means of attaching the hydrophone 30 to a tool or other device may be provided without departing from the principles of the present invention.

The mounting portion 44 serves another purpose in the hydrophone 30, which substantially enhances the functionality of the hydrophone. Specifically, the mounting portion 44 is configured so that it ensures that acceleration of the tool (to which the hydrophone 30 is attached) along the axis 36 does not contribute to the output of the hydrophone. In part, this result is achieved by aligning the mounting portion 44 with a center of mass 48 of the stack 34.

Figure 2B:
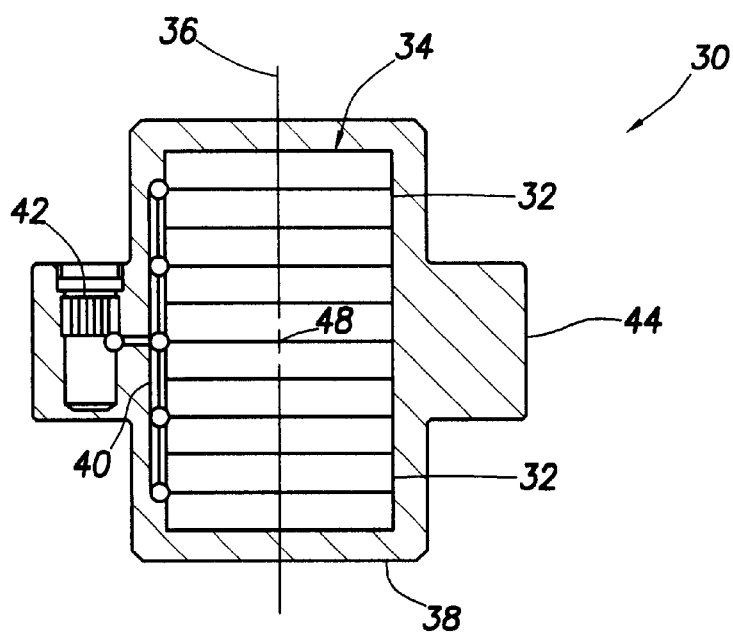

When the tool, device, fixture, etc. to which the hydrophone 30 is attached is accelerated along the axis 36, the mounting portion 44 transfers this acceleration to the center of mass 48 of the stack 34. It will be readily appreciated by one skilled in the art that acceleration of the center of mass 48 along the axis 36 in the upward direction as viewed in FIG. 2B will cause compression of the crystals 32 above the center of mass and will cause extension of the crystals below the center of mass. Since the crystals 32 are wired in parallel and piezoelectric crystals produce opposite outputs in response to compression and extension of the crystals, the outputs of the crystals due to acceleration along the axis 36 cancel each other out. Thus, the configuration of the mounting portion 44 ensures that tool movement, vibration, shock loads, etc. along the axis 36 result in compression in one portion of the stack 34 and tension in another portion of the stack, thereby permitting the outputs due to the compression and tension of the crystals 32 to cancel out so that the overall output of the hydrophone 30 includes no contribution due to movement of the tool along the axis 36.

Another feature of the hydrophone 30 reduces or eliminates any contribution to the hydrophone output of tool movement in the lateral direction, that is, perpendicular to the axis 36. The crystals 32 are preferably made of lead titanate, which, when configured as in the hydrophone 30, are substantially insensitive to lateral forces applied thereto. Thus, the hydrophone 30 output does not include contributions due to either axial or lateral movement of the tool to which it is attached.

It is to be clearly understood that it is not necessary for a pressure pulse sensor constructed in accordance with the principles of the present invention to include lead titanate piezoelectric crystals, or for such a pressure pulse sensor to include multiple lead titanate crystals. For example, a hydrophone could include only one lead titanate crystal, or could include multiple crystals of another material, or a combination of materials including lead titanate, etc. Additionally, note that the stack 34 of the hydrophone 30 includes an even number of crystals 32, with the center of mass 48 being located between equal whole numbers of the crystals above and below the center of mass. However, an odd number of the crystals 32 could be used, with the center of mass 48 being located within one of the crystals. Therefore, it may be clearly seen that the principles of the present invention are not limited by the details of the specific embodiments described herein.

Figure 3A:
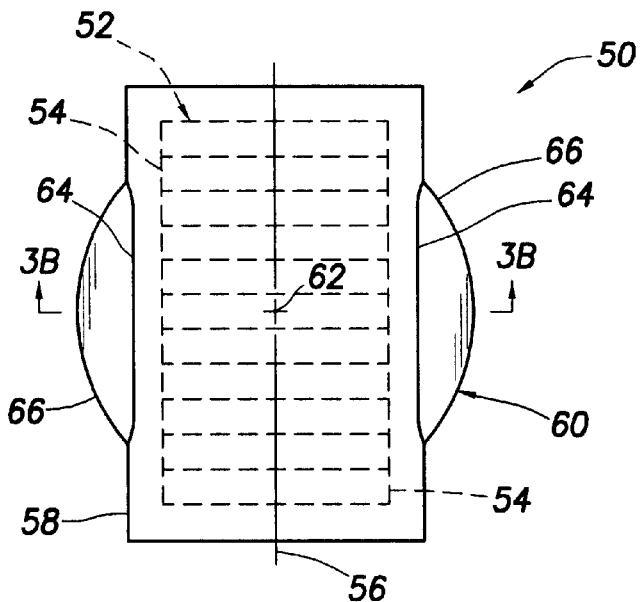
FIGS. 3A&B are top plan and cross-sectional views, respectively, of a second hydrophone embodying principles of the present invention.
Figure 3B:
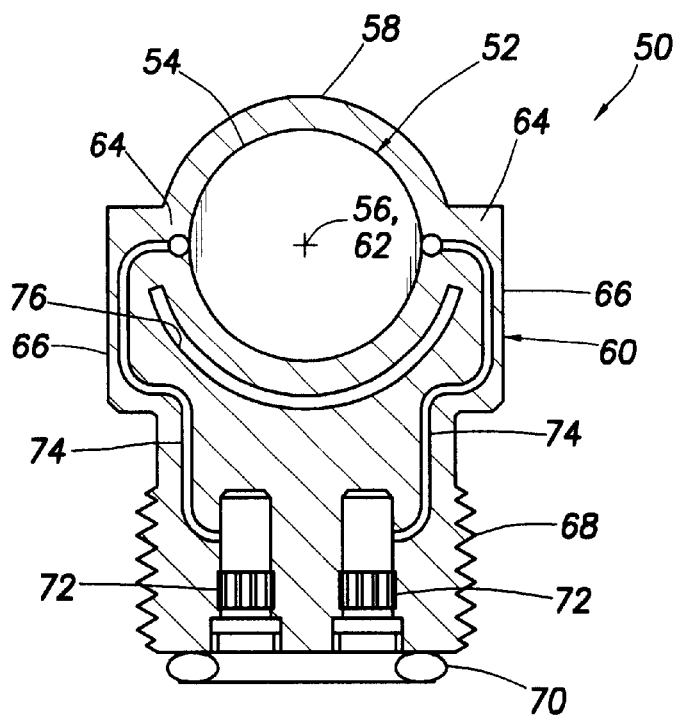

Referring additionally now to FIGS. 3A&B, another hydrophone 50 embodying principles of the present invention is representatively illustrated. The hydrophone 50 is similar in many respects to the hydrophone 30 described above, but differs in at least one respect in the manner in which it is mounted to a tool, fixture, or other device.

The hydrophone 50, like the hydrophone 30, includes a stack 52 of generally disc-shaped piezoelectric crystals 54 aligned with an axis 56. The stack 52 is enclosed by a relatively thin membrane 58 which isolates the stack 52 from contact with fluid surrounding the hydrophone 50, but permits pressure pulses to be transmitted from the fluid to the crystals 54. The crystals 54 may be lead titanate or another material.

The hydrophone 50 includes a mounting portion 60 which is aligned with a center of mass 62 of the stack 52, so that acceleration forces applied to the mounting portion are transferred to the stack center of mass. In this manner, like in the hydrophone 30, when the tool to which the hydrophone 50 is attached accelerates upwardly along the axis 56 as viewed in FIG. 3A, the portion of the stack 52 above the center of mass 62 will be compressed and the portion of the stack below the center of mass will be extended. Of course, the opposite will occur when the tool is accelerated downwardly along the axis 56. Thus, the output of the hydrophone 50 will include no contribution due to the acceleration of the tool along the axis 56. Additionally, if the crystals 54 are made of lead titanate, the hydrophone 50 output may also not include any contribution due to the acceleration of the tool perpendicular to the axis 56.

Note that the mounting portion 60 differs in at least one significant respect from the previously described mounting portion 44 of the hydrophone 30 in that it is attached at opposite lateral sides 64 of the stack 52. These attachments are at ends of two legs 66 of the yoke-shaped upper part of mounting portion 60. The two legs 66, at their attachment to the stack 52 via the membrane 58, have the center of mass 62 centered between them, both laterally and longitudinally. Thus, when the mounting portion 60 is made to accelerate due to acceleration of the tool to which it is mounted, that acceleration is transferred to the center of mass 62 of the stack 52.

The lower part of the mounting portion 60 has threads 68 formed thereon for installing the hydrophone 50 in a tool, fixture or other device. A seal 70 provides fluid isolation for connectors 72 in the mounting portion 60, and the connectors are interconnected to the crystals 54 in parallel via conductors 74, which extend through the legs 66.

An opening 76 is formed through the hydrophone 50 between the membrane 58 and the mounting portion 60. The opening 76 ensures that fluid pressure is applied substantially evenly or symmetrically to the crystals 54.

In the hydrophone 50, there are eleven crystals 54 and the center of mass 62 is within a middle one of the crystals. Thus, the hydrophone 50 illustrates that there may be an odd number of crystals 54 and the mounting portion 60 may be aligned with a center of mass 62 within one of the crystals, without departing from the principles of the present invention.

Figure 4A:
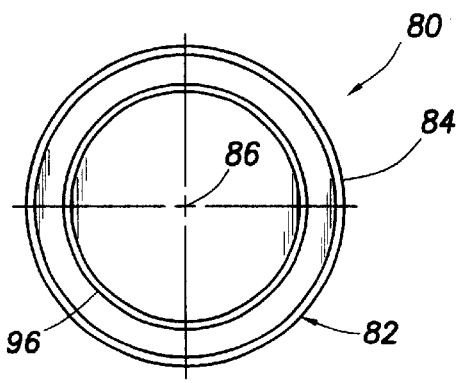
FIGS. 4A&B are top plan and cross-sectional views, respectively, of a third hydrophone embodying principles of the present invention.
Figure 4B:
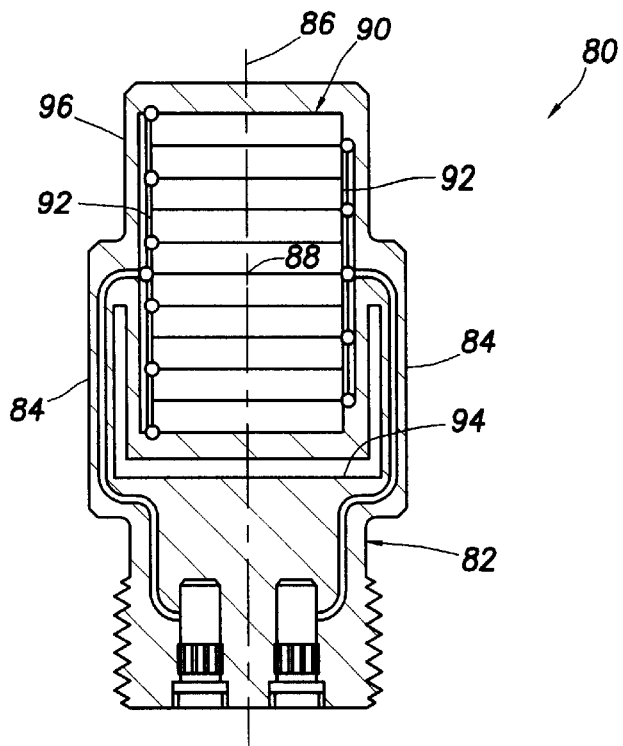

Referring additionally now to FIGS. 4A&B, another hydrophone 80 embodying principles of the present invention is representatively illustrated. The hydrophone 80 is similar in many respects to the hydrophone 50 described above, but differs in at least one significant respect in the configuration of its mounting portion 82.

In the hydrophone 80, the mounting portion 82 has yoke legs 84 which extend parallel to a longitudinal axis 86 of a stack 90 of piezoelectric crystals 92, instead of extending perpendicular to the axis 56 as in the hydrophone 50. Nevertheless, the attachment of the legs 84 to opposite lateral sides of the stack 90 remains aligned with the stack center of mass 88. The hydrophone 80 also includes an opening 94 formed between the mounting portion 82 and a membrane 96 enclosing the stack 90, for even or symmetrical application of fluid pressure to the crystals 92.

FIG. 4A shows an alternate construction of the hydrophone 80 in which the legs 84 extend completely circumferentially about the stack 90 and, thus, are not really "legs", since they then join to form a hollow cylinder. In that case, the opening 94 is placed in fluid communication with fluid surrounding the hydrophone 80 via another opening (not shown) extending laterally through the hollow cylinder formed by the "legs" 84.

Figure 5:
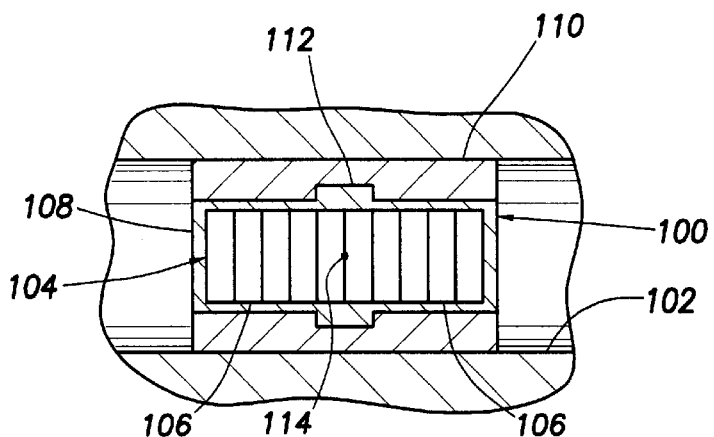
FIG. 5 is a cross-sectional view of a fourth hydrophone embodying principles of the present invention.

Referring additionally now to FIG. 5, another hydrophone 100 embodying principles of the present invention is representatively illustrated. The hydrophone 100 is depicted mounted within a tool, fixture or other device 102.

As with the other hydrophones described above, the hydrophone 100 includes a stack 104 of axially aligned piezoelectric crystals 106 enclosed by a relatively thin membrane 108. However, the hydrophone 100 does not have a discreet point or points at which it is mounted to the tool 102. Instead, the hydrophone 100 includes a mounting portion 110 which is distributed in an annular space between the membrane 108 and the tool 102.

The mounting portion 110 is made of a very compliant material, such as an elastomer, which permits limited movement of the stack 104 relative to the tool 102. A radially enlarged portion 112 of the membrane 108 prevents inadvertent removal of the stack 104 from within the mounting portion 110 and provides a location for connectors, such as the connectors 42 of the hydrophone 30. The radially enlarged portion 112 is also aligned with a center of mass 114 of the stack 104.

The hydrophone 100 illustrates that it is not necessary for a pressure pulse sensor constructed in accordance with the principles of the present invention to have discreet mounting points for attachment to a tool.

Figure 6:
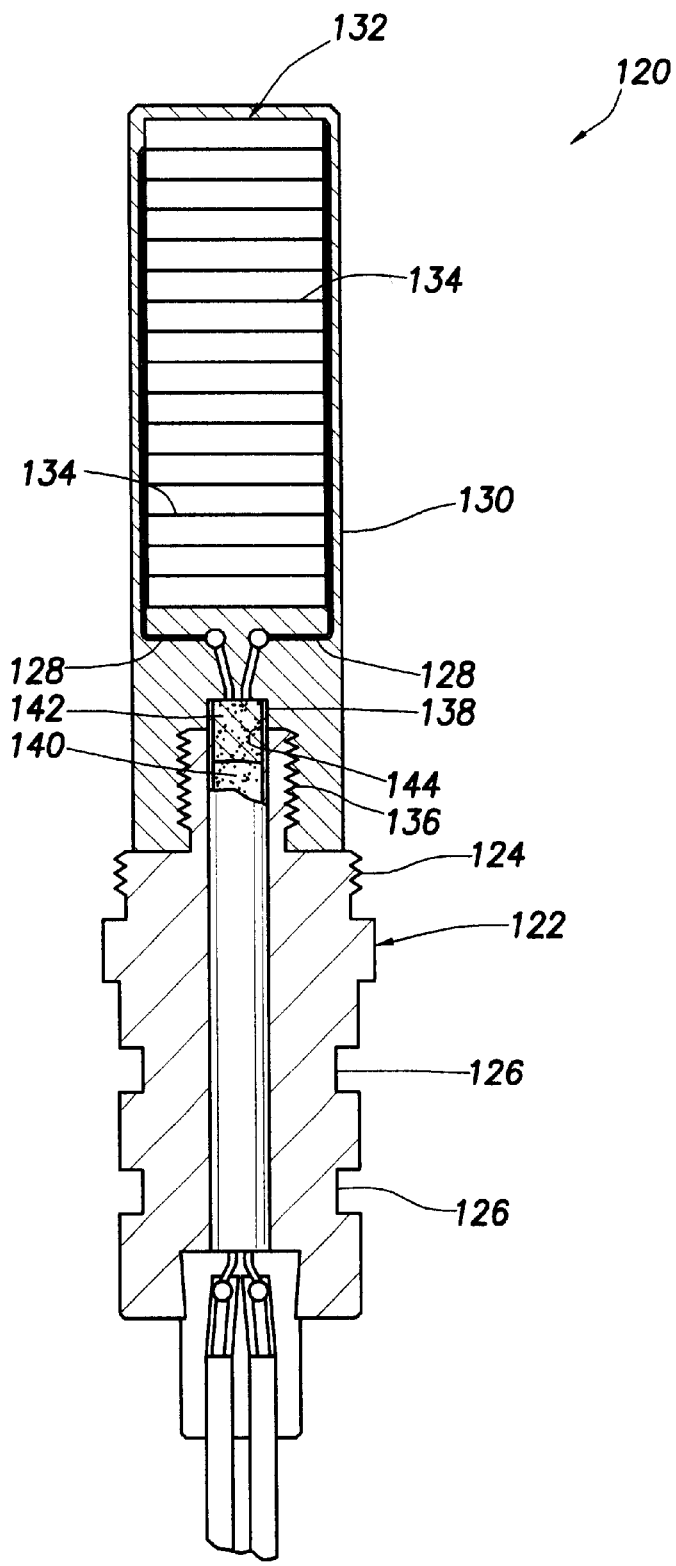
FIG. 6 is a cross-sectional view of a fifth hydrophone embodying principles of the present invention.

Referring additionally now to FIG. 6, another hydrophone 120 embodying principles of the present invention is representatively illustrated. Unlike the hydrophones 30, 50, 80, 100 described above, the hydrophone 120 does not have a mounting portion aligned with a center of mass of a stack of crystals. However, the hydrophone 120 does include features which permit enhanced interconnection of hydrophones and other sensors to tools.

Specifically, the hydrophone 120 includes a bulkhead 122, which is provided with threads 124 and annular grooves 126 for seals (not shown) for securely and sealingly attaching the hydrophone 120 to a tool. The bulkhead 122 enables conductors 128 to pass from the interior of a membrane 130 enclosing a stack 132 of crystals 134, which may be surrounded by pressurized fluid, to the interior of a tool, which must be isolated from the fluid.

In one unique feature of the hydrophone 120, the membrane 130 is formed so that it exerts an inwardly directed force on threads 136 which form a circuitous path on the bulkhead 122. Specifically, in the preferred embodiment, the membrane 130 is made of an epoxy material which contracts as it cures. The epoxy material is introduced into a mold which is attached to the bulkhead 122 and, as the epoxy material cures, it grips tightly about the threads 136, thereby preventing fluid communication between the epoxy material and the threads.

In another unique feature of the hydrophone 120, the epoxy material extends into a tube 138 brazed to the bulkhead 122. The tube 138 preferably contains an insulating substance 140, such as magnesium oxide powder. As the epoxy material is introduced into the mold as described above, some of the epoxy enters the tube 138 and mixes with the insulating substance 140. This mixture 142 forms a plug which further prevents fluid communication through an internal passage 144 of the tube 138.

The hydrophone 120 may then be installed in a tool with the stack 132 enclosed by the membrane 130 being exposed to pressurized well fluids, while the conductors 128 extend through the bulkhead 122 and into the interior of the tool isolated from the well fluids.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims.

What is claimed is:

1. A method of detecting a pressure pulse in a fluid, the method comprising the steps of:

providing a device having a piezoelectric crystal structure;

positioning the device in the fluid;

using the device to sense a pressure pulse within the fluid, by subjecting the entire piezoelectric crystal portion of the device to the fluid pressure forces of the pressure pulse, and responsively generate a piezoelectric output signal indicative of the sensed pressure pulse; and preventing the device from generating a piezoelectric output signal indicative of movement of the device.

2. The method of claim 1, wherein:

the providing step includes the step of forming the piezoelectric crystal structure from a stack of piezoelectric crystals.

3. The method of claim 2, wherein:

the stack of piezoelectric crystals extends along a longitudinal axis, and the using step includes the step of accelerating the device along the longitudinal axis.

4. The method of claim 1, wherein:

the using step includes the step of placing the device within a wellbore.

5. The method of claim 1, wherein:

the using step includes the step of moving the device.

6. The method of claim 1, further comprising the step of:

providing a membrane isolating the crystal structure from fluid surrounding the device and the membrane permitting transfer of fluid pressure from the fluid to the crystal.

7. The method of claim 6 further comprising the step of:

forming the membrane from an epoxy composition.

8. A method of detecting a pressure pulse, the method comprising the steps of:

providing a device having a piezoelectric crystal structure connected to an output portion and including at least one lead titanate piezoelectric crystal, the entire piezoelectric crystal portion of the device being operative to sense a pressure pulse and generate, via the output portion, a signal indicative of the sensed pressure pulse;

subjecting the entire piezoelectric crystal portion of the device to the fluid pressure forces of a pressure pulse to thereby generate the signal; and preventing movement of the device from causing the piezoelectric crystal structure to output any net signal indicative of the movement of the device.

9. The method of claim 8, wherein:

the providing step includes the step of forming the piezoelectric crystal structure from at least one generally disc-shaped lead titanate piezoelectric crystal.

10. The method of claim 9, wherein:

the providing step includes the step of forming the piezoelectric crystal structure from multiple ones of the disc-shaped crystals in a stack.

11. The method of claim 10, wherein:

the providing step includes the step of wiring the crystals together in a stack.

12. The method of claim 8, wherein:

the piezoelectric structure includes multiple ones of the crystals in a stack, and the preventing step includes the step of mounting the stack so that acceleration applied to the stack along a longitudinal axis of the stack applies a compressive force to a first portion of the stack and a tensile force to a second portion of the stack.

13. The method of claim 12, wherein:

the mounting step is performed in a manner such that there are equal numbers of the crystals in the first and second stack portions.

14. The method of claim 8, wherein:

the piezoelectric crystal structure includes multiple ones of the crystals in a stack, the stack has a center of mass, and the preventing step includes the step of mounting the stack in a manner such that acceleration applied to the stack along a longitudinal axis of the stack applies a compressive force to a first portion of the stack on a first side of the center of mass and a tensile force to a second portion of the stack on a second side of the center of mass.

15. The method of claim 14 wherein:

the mounting step is performed in a manner such that there are equal numbers of the crystals in the first and second stack portions.

16. A method of detecting a pressure pulse, the method comprising the steps of:

providing a device having a group of multiple piezoelectric crystals aligned with an axis and connected to an output portion, and a mounting portion attached to the group of crystals;

forming the mounting portion from a membrane that isolates the crystals from fluid surrounding the device and permits fluid pressure transfer to the crystals from the fluid;

accelerating the mounting portion along the axis in a manner causing a compression of a first portion of the group of crystals along the axis and a resulting first piezoelectric output from the first portion of the group of crystals, and causing an extension of a second portion of the group of crystals along the axis and a resulting second piezoelectric output from the second portion of the group of crystals which cancels out the first piezoelectric output; and causing the device to sense a pressure pulse and responsively generate, via the output portion, a signal indicative of the sensed pressure pulse.

17. The method of claim 16 further comprising the step of:

arranging the group of multiple piezoelectric crystals in a manner such that an equal number of crystals are in the first and second portions.

18. The method of claim 16, further comprising the step of:

forming the crystals from lead titanate.

19. The method of claim 16 further comprising the step of:

attaching the mounting portion to the group of group of crystals in alignment with a center of mass of the crystals.

20. The method of claim 16, further comprising the step of:

attaching the crystals to each other in a manner permitting transfer of tensile force therebetween.

21. The method of claim 16 further comprising the step of:

adhesively bonding the crystals to one another.

22. A method of detecting a pressure pulse, the method comprising the steps of:

providing a device having a group of multiple piezoelectric crystals aligned with an axis and connected to an output portion, and a mounting portion attached to the group of crystals;

accelerating the mounting portion along the axis in a manner causing a compression of a first portion of the group of crystals along the axis and a resulting first piezoelectric output from the first portion of the group of crystals, and causing an extension of a second portion of the group of crystals along the axis and a resulting second piezoelectric output from the second portion of the group of crystals which cancels out the first piezoelectric output;

causing the device to sense a pressure pulse and responsively generate, via the output portion, a signal indicative of the sensed pressure pulse;

enclosing the group of crystals within the mounting portion; and configuring the mounting portion to have a relatively thin part and a relatively thick part.

23. The method of claim 22 wherein:

the enclosing step is performed using the relatively thin part to isolate the crystals from contact with fluid surrounding the device and permit transfer of fluid pressure from the fluid to the crystals.

24. The method of claim 22 wherein:

the enclosing step is performed in a manner such that the relatively thick part is aligned with a center of mass of the group of crystals.

25. The method of claim 16 wherein:

the providing step includes the step of providing the mounting portion with at least one attachment to the group of crystals aligned with a canter of mass of the group of crystals.

* * * * *